Patented Feb. 19, 1946

2,395,048

UNITED STATES PATENT OFFICE 2,395,048

CATALYTIC TREATMENT OF HYDROCARBONS

Robert R. Hibbard, Lorain, Ohio, assignor to The Standard Oil Company, Cleveland, Ohio, a corporation of Ohio No Drawing. Original application February 4, 1942, Serial No. 429,581. Divided and this application September 11, 1942, Serial No. 457,927

12 Claims. (Cl. 196—50)

Co-precipitated gel type catalysts containing chromium oxide have been generally favored heretofore over supported type catalysts, although the latter offer particular advantages from a manufacturing standpoint. The structure of an oxide catalyst is of particular importance as determining its functioning efficiency, and heretofore supported type catalysts have seemed to lack the high porosity obtainable in precipitated catalysts. In accordance with the present invention however, it now becomes possible to prepare catalysts of supported type such as to have remarkable efficiency, and advantages of easy and reliable large scale manufacture. Other objects and advantages will appear from the description following.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The present catalysts may be prepared by applying a previously formed support component or mixtures with other oxides, in such a manner that an intimate association is obtained, as by precipitation of the chromium oxide providing component. The source of the chromium oxide component is $CrO_3$ which is suitably reacted upon by an organic reducing agent for precipitation and association with the other catalyst component or support. The latter is of a character unreactive with $CrO_3$, or at least not decomposed thereby such as to be detrimental to either of the catalyst components, and thus the unreactive component is a hydroxide or oxide such as of aluminum, silicon, etc. Such unreactive hydroxide or oxide may be applied either freshly precipitated, or it may be dried and ground. In either case, this component is made into a slurry, $CrO_3$ is added thereto and dissolved, and it is then reduced by incorporation of a suitable organic reducing agent to form insoluble lower oxides of chromium in intimate mixture with the other component or support. The precipitate is filtered and washed and dried. The reducing agent may be for instance ethanol, oxalic acid, sucrose, etc. Generally, it is desirable to allow the reducing agent to act for a prolonged time, and desirably at elevated temperature. Refluxing under pressure may be applied and thereby shorten the time of preparation of the catalyst. Generally, it is advantageous to add the reducing agent in successive small increments; and the washed precipitate may be dried at a low temperature, for a prolonged time, and then be finely divided to a desired mesh size, and then be dried at elevated temperature. The catalyst may then be re-washed and dried.

As an example: 2.4 mols or 900 parts by weight of $Al(NO_3)_3.9H_2O$ is precipitated with 288 parts of NaOH in 15000 parts of water. After filtering and washing with 15000 parts of water, the precipitate is re-pulped in 3000 parts of water. 100 parts by weight of $CrO_3$ is dissolved in this slurry, and 50 parts of ethyl alcohol added in 5 parts/5 minute increments at room temperature with stirring. The mixture is then slowly refluxed with stirring for about 60 hours. After 20 hours 50 parts more of ethyl alcohol is added, and after 28 hours 50 parts more. The mixture is filtered, washed with 3000 parts of water, and dried at about 140° F. for about 74 hours, after which it is finely divided to 10–20 mesh size and is dried at 900° F. The catalyst is then re-washed and dried. This catalyst contains 27 mol per cent of chromium oxide and 73 mol per cent of aluminum oxide.

Similarly, other alkaline hydroxides may be applied as precipitating agents in the initial preparation of the component other than the chromium oxide portion of the catalyst; or where such component is used in dry form it is made into a slurry in finely ground condition.

The catalyst prepared by the present process is peculiar in having a particularly low density. For instance, as compared with a similar chromium-aluminum oxide catalyst of co-precipitated gel type, the density was 0.525 g./cc. as compared with 0.88 g./cc. for the latter. Weight for weight, the present catalyst is very much superior to the usual catalysts of comparable composition.

The present catalysts are applicable for operations on hydrocarbons, particularly non-benzenoid hydrocarbons, pure or isolated hydrocarbons or naphthas, distillates, etc., as in reforming, aromatizing, desulphurizing or cracking, etc. The feed rate of hydrocarbons to the catalyst may be 0.1–10 liquid volumes per volume of catalyst per hour. Temperatures for instance of 850–1200° F. are applicable; and pressures of atmospheric up to about 300 pounds, preferably 50–300 pounds per square inch. Operation may be carried on in the presence of hydrogen, for instance partial pressures up to 300 pounds per square inch. The hydrogen may be supplied in amounts of 0.1–10 mols of hydrogen per mol of hydrocarbon feed.

In some cases it is desirable to re-circulate a portion of the off-gases.

As an example: A catalyst operating on a naphtha from Illinois petroleum, at 980° F., and flow rate of 1.3 V. V. H. and 3 mols of hydrogen feed per mol of naphtha, gave a Kattwinkel test of 60. A comparable catalyst made by co-precipitation to form chromium and aluminum oxides and similarly dried and washed, operated on similar naphtha with similar conditions of temperature, flow rate and hydrogen supply, gave a Kattwinkel test of 56.

This application is a division of my application Serial No. 429,581, filed Feb. 4, 1942.

Other modes of applying the principle of the invention may be employed, change being made as regards the details described, provided the features stated in any of the following claims, or the equivalent of such, be employed.

I therefore particularly point out and distinctly claim as my invention:

1. A process of the character described, which comprises subjecting a naphtha in the presence of hydrogen, at a temperature of 850–1250° F., to the action of a catalyst consisting of the product of reaction of an organic reducing agent on $CrO_3$ in a slurry of aluminum hydroxide.

2. A process of the character described, which comprises subjecting a naphtha in the presence of hydrogen, at a temperature of 850–1250° F., to the action of a catalyst consisting of the product of reaction of an organic reducing agent on $CrO_3$ in a slurry of another catalyst component in a finely divided condition selected from the group consisting of precipitated hydroxides and oxides formed by dehydrating precipitated hydroxides both members of the group being unreactive with $CrO_3$.

3. A process of the character described, which comprises subjecting a naphtha, at a temperature of 850–1200° F., to the action of a catalyst consisting of the product of reaction of an organic reducing agent on $CrO_3$ in a slurry of aluminum hydroxide, and returning a portion of off-gas to the catalyst zone.

4. A process of the character described, which comprises subjecting a naphtha, at a temperature of 850–1200° F., to the action of a catalyst consisting of the product of reaction of an organic reducing agent on $CrO_3$ in a slurry of another catalyst component in a finely divided condition selected from the group consisting of precipitated hydroxides and oxides formed by dehydrating precipitated hydroxides both members of the group being unreactive with $CrO_3$, and returning a portion of off-gas to the catalyst zone.

5. A process of the character described, which comprises subjecting a naphtha to elevated temperature and the action of a catalyst consisting of the reaction product of an organic reducing agent on $CrO_3$ in a slurry of aluminum hydroxide.

6. A process of the character described, which comprises subjecting a naphtha to elevated temperature and the action of a catalyst consisting of the reaction product of an organic reducing agent on $CrO_3$ in a slurry of another catalyst component in a finely divided condition selected from the group consisting of precipitated hydroxides and oxides formed by dehydrating precipitated hydroxides both members of the group being unreactive with $CrO_3$.

7. A process of the character described, which comprises subjecting a non-benzenoid hydrocarbon in the presence of hydrogen, at a temperature of 850–1250° F., to the action of a catalyst consisting of the product of reaction of an organic reducing agent on $CrO_3$ in a slurry of aluminum hydroxide.

8. A process of the character described, which comprises subjecting a non-benzenoid hydrocarbon in the presence of hydrogen, at a temperature of 850–1250° F., to the action of a catalyst consisting of the product of reaction of an organic reducing agent on $CrO_3$ in a slurry of another catalyst component in a finely divided condition selected from the group consisting of precipitated hydroxides and oxides formed by dehydrating precipitated hydroxides both members of the group being unreactive with $CrO_3$.

9. A process of the character described, which comprises subjecting a non-benzenoid hydrocarbon, at a temperature of 850–1200° F., to the action of a catalyst consisting of the product of reaction of an organic reducing agent on $CrO_3$ in a slurry of aluminum hydroxide, and returning a portion of off-gas to the catalyst zone.

10. A process of the character described, which comprises subjecting a non-benzenoid hydrocarbon, at a temperature of 850–1200° F., to the action of a catalyst consisting of the product of reaction of an organic reducing agent on $CrO_3$ in a slurry of another catalyst component in a finely divided condition selected from the group consisting of precipitated hydroxides and oxides formed by dehydrating precipitated hydroxides both members of the group being unreactive with $CrO_3$, and returning a portion of off-gas to the catalyst zone.

11. A process of the character described, which comprises subjecting a non-benzenoid hydrocarbon to elevated temperature and the action of a catalyst consisting of the reaction product of an organic reducing agent on $CrO_3$ in a slurry of aluminum hydroxide.

12. A process of the character described, which comprises subjecting a non-benzenoid hydrocarbon to elevated temperature and the action of a catalyst consisting of the reaction product of an organic reducing agent on $CrO_3$ in a slurry of another catalyst component in a finely divided condition selected from the group consisting of precipitated hydroxides and oxides formed by dehydrating precipitated hydroxides both members of the group being unreactive with $CrO_3$.

ROBERT R. HIBBARD.

Certificate of Correction

Patent No. 2,395,048.　　　　　　　　　　　　　　　　　　　　February 19, 1946.

ROBERT R. HIBBARD

It is hereby certified that error appears in the printed specification of the above numbered patent requiring correction as follows: Page 2, first column, line 55, claim 4, for "$CrD_3$," read $CrO_3$; and that the said Letters Patent should be read with this correction therein that the same may conform to the record of the case in the Patent Office.

Signed and sealed this 30th day of April, A. D. 1946.

[SEAL]

LESLIE FRAZER,
*First Assistant Commissioner of Patents.*